United States Patent [19]
Tyren et al.

[11] Patent Number: 5,557,085
[45] Date of Patent: Sep. 17, 1996

[54] METHOD AND DEVICE FOR ELECTRONIC IDENTIFICATION

[75] Inventors: Carl Tyren, Antibes, France; Leif A. Persson, Staffanstorp, Sweden

[73] Assignee: RSO Corporation N.V., Netherlands

[21] Appl. No.: 256,487

[22] PCT Filed: Jan. 20, 1993

[86] PCT No.: PCT/SE93/00038

§ 371 Date: Sep. 6, 1994

§ 102(e) Date: Sep. 6, 1994

[87] PCT Pub. No.: WO93/14474

PCT Pub. Date: Jul. 22, 1993

[30] Foreign Application Priority Data

Jan. 20, 1992 [SE] Sweden ................................. 9200145
Nov. 18, 1992 [SE] Sweden ................................. 9203479

[51] Int. Cl.$^6$ ........................................... G06K 5/00
[52] U.S. Cl. .......................................... 235/380; 235/491
[58] Field of Search ................................ 235/491, 492, 235/375, 380, 449; 340/572

[56] References Cited

U.S. PATENT DOCUMENTS

| | | | |
|---|---|---|---|
| 4,071,818 | 1/1978 | Krisst ........................................ | 324/208 |
| 4,168,496 | 9/1979 | Lichtblau ................................. | 340/572 |
| 4,388,524 | 6/1983 | Walton ..................................... | 235/380 |
| 4,399,437 | 8/1983 | Falck et al. ............................ | 235/380 X |
| 4,459,474 | 7/1984 | Walton ..................................... | 235/380 |
| 4,495,496 | 1/1985 | Miller, III ............................. | 340/825.54 |
| 4,510,490 | 4/1985 | Anderson, III et al. ................ | 340/572 |
| 4,584,577 | 4/1986 | Temple ................................. | 340/870.32 |
| 4,600,829 | 7/1986 | Walton ..................................... | 235/439 |
| 4,647,917 | 3/1987 | Anderson, III et al. ................ | 340/572 |
| 4,656,463 | 4/1987 | Anders et al. ........................... | 340/572 |
| 4,727,360 | 2/1988 | Ferguson et al. ....................... | 340/572 |
| 4,940,966 | 7/1990 | Pettigrew et al. ................... | 340/572 X |
| 4,980,670 | 12/1990 | Humphrey et al. ................. | 340/572 X |
| 5,001,458 | 3/1991 | Tyren et al. .......................... | 340/572 X |
| 5,099,225 | 3/1992 | Narlow et al. ........................... | 340/572 |
| 5,111,186 | 5/1992 | Narlow et al. ........................... | 340/572 |
| 5,406,262 | 4/1995 | Herman et al. ......................... | 340/572 |

FOREIGN PATENT DOCUMENTS

| | | |
|---|---|---|
| 0338696 | 10/1989 | European Pat. Off. . |
| 0366335A2 | 5/1990 | European Pat. Off. ....... G06K 19/06 |
| 88/01427 | 2/1988 | WIPO . |
| 89/01722 | 2/1989 | WIPO . |
| 91/00494 | 1/1991 | WIPO . |
| 91/17515 | 11/1991 | WIPO . |

*Primary Examiner*—Donald T. Hajec
*Assistant Examiner*—Steven Wigmore
*Attorney, Agent, or Firm*—Merchant, Gould, Smith, Edell, Welter and Schmidt

[57] ABSTRACT

Electronic identification device includes a circuitry (10) for generating and emitting an electromagnetic field and a plurality of transponder units (11). Each of the transponder unit includes a storing circuitry (12) for storing identification data, and a transmitting circuitry (13) for transmitting a signal including the identification data when the transponder unit (11) has been exposed to the electromagnetic field. The electronic identification device further includes a receiving circuitry (14) for receiving the signal and for decoding the identification data. At least one element (15) of a material, having the magnetic or electrical properties being influenced by external magnetic fields, is disposed on or in the absolute vicinity of the transponder unit (11), and a magnetic field generating circuitry (16) for generating a magnetic field is provided at an interrogation zone (17) to activate any element (15) appearing in the interrogation zone (17). A processing circuitry (18) is provided in the transponder unit (11) to modify the signal in dependence of the magnetic field activating the element (15).

8 Claims, 3 Drawing Sheets

METHOD AND DEVICE FOR ELECTRONIC IDENTIFICATION

TECHNICAL FIELD

The invention relates to an electronic identification device and a method in such a device. By means of said identification device it is possible to detect presence of objects in an interrogation zone and also the identity of said objects. The detection is made contactless.

PRIOR ART

For a long time so called transponders functioning as electronic identification devices have been used in a variety of areas. Such a transponder comprises some type of means that is affected by an external signal to transmit or respond with another signal. Said external signal is generated by a transmitter means transmitting said signal within a specific area, a so called interrogation zone. Normally the reply signal includes such information that the transmitter means or a receiver means operatively connected thereto will be informed that the transponder is present in the interrogation zone. The information may exist in form of a specific reply frequency from an oscillator circuit on said transponder or by such influence of the external signal that the transmitter means can identify the transponder.

In agriculture this type of transponder has been used to identify specific animals in a group of animals. In these applications the transponder is attached to some part of the body of the animal, for instance the ear, and the response signal from the transponder is used for instance for portioning out food and for administrating drugs. There are also transponders, the reply signal thereof including besides the identification signal also information about for instance the body temperature of the animal.

Latter developments of microtechniques have made possible further developed transponders including an arithmetic unit and a memory unit having a considerably calculating and memory capacity. In such embodiments the reply signal can be far more complex and comprise large amounts of information taken for instance from said memory unit. It is possible also to transmit to said transponder information to be stored in the memory unit thereof. A transponder of this type is disclosed in WO91/17515.

Normally a transponder is formed so that the reply signal thereof differs from the reply signal of other transponders. One of the most common applications for transponders is exactly to identify which bodies or which objects that carry the transponder. Identical objects normally carry identical transponders, that is transponders that are adjusted to transmit the same reply signal. In such cases problems arise if a plurality of identical objects at the same time are located in the interrogation zone where they will be reached by the external signal.

SUMMARY OF THE INVENTION

An object of the present invention is thus to overcome this problem and to allow identification or separation of a plurality of identical objects in said interrogation zone, and also to make possible collection of completing information about the object, for instance the position or orientation thereof in the interrogation zone. The object will be achieved by using elements which are produced by materials, the magnetic or magnetomechanical properties thereof depending on and being influenced by an external magnetic field.

According to the invention preferably sensors made of so called amorphous material are used but also other materials having similar magnetic properties can be used. It is possible also to use other sensors, the electrical or magnetical properties thereof being altered by external magnetic fields. Such sensors are for instance magnetoresistive sensors, that is sensors in which the electrical conductivity being changed in dependence of magnetic fields, and magnetooptical sensors, that is sensors in which the light conductivity is changed in dependence of an applied magnetic field. Sensors made of the latter type may use for instance the phenomenon referred to as the FARADAY EFFECT, that is that the oscillation plane of polarized light is pivoted, the pivoting angle being proportional to the magnetic field strength, or the phenomenon referred to as KERR EFFECT according to which a similar effect appears in certain materials when affected by an electric field.

Thus, the invention is based on the fact that some physical properties, for instance magnetic, electric and mechanical properties, of elements shaped as tapes, wires or strips made of a material that is amorphous are changed when the elements are exposed to a magnetic field, a so called bias field. Also elements formed as thin film elements can be used. The elements can also in other aspects be sensitive to magnetic fields. For instance the position/direction of the elements is related to the magnetic field in the longitudinal or axial direction of the amorphous element, so that the mechanical resonant frequency of the elements will be a measure of the position/direction of the element. Corresponding conditions apply for a transponder including an amorphous element which is magnetically coupled to an inductive element which in turn is included in an electric resonant circuit. When the magnetic field is changed the magnetic properties of the amorphous element are changed, that is the permeability of the element, so that the inductance of the inductive element is changed. Thus, also the resonant frequency of the electric resonant circuit is changed. A measuring signal that is related to the external magnetic field may also be obtained by a direct measuring of the impedance of the element.

The resonant frequency of an amorphous element showing a comparatively large magnetomechanical coupling is changed by the so called delta E-effect with the magnetic flux intensity along the main direction of the element. If the magnetic flux intensity is changed as a function of the position/direction of the amorphous element the resonant frequency of the amorphous element will be a function of the position/direction thereof. It is an advantage that the measuring information about the flux intensity or flux direction is given as a frequency value because such a value is very immune to interferences. Furthermore, a mixed information of a plurality of gages, operating at different frequency bands, can be transferred together over one information channel.

Tapes made of amorphous material have a high magnetomechanical coupling indicating for instance that the tapes can be made to oscillate mechanically by applying magnetic energy. During the mechanical oscillation also the magnetic properties of the tape are changed, whereby said changes can be recorded by a detecting coil or similar device. An essential factor for the resonant frequency of the tape is the modulus of elasticity of the tape. As the modulus of elasticity of the amorphous tapes used depends on an external magnetic field it is possible by varying such an external magnetic field to change the resonant frequency of the tape. It is a condition in this type of system that the tapes are arranged to be moved freely so that the mechanical movement thereof during oscillation is not stopped or influenced to such an extent that a secure detection is jeopardized. The excitation of the tapes to oscillation as well as detecting the resonant frequency are made through magnetic fields.

Also other types of elements affected by an external magnetic field can be used according to the invention. It is for instance possible to use Hall elements that will provide an output signal in dependence of an external magnetic field.

One way of using an external magnetic field, a so called bias field, to allow a detection of a plurality of identical objects or objects that are provided with an identical set of amorphous tapes in a label is disclosed in EP 00330656. According to EP 00330656 a spatially heterogenous magnetic field is used in the interrogation zone. Thus, a plurality of labels located in different sub areas of said interrogation zone exhibiting a magnetic field of different strength or direction can be detected and identified even if a plurality of labels are provided with identical sets of tapes.

BRIEF DESCRIPTION OF THE DRAWINGS

The invention will now be described in more detail by means of embodiments, reference being made to the accompanying drawings in which.

DETAILED DESCRIPTION OF THE INVENTION

Figure 1:
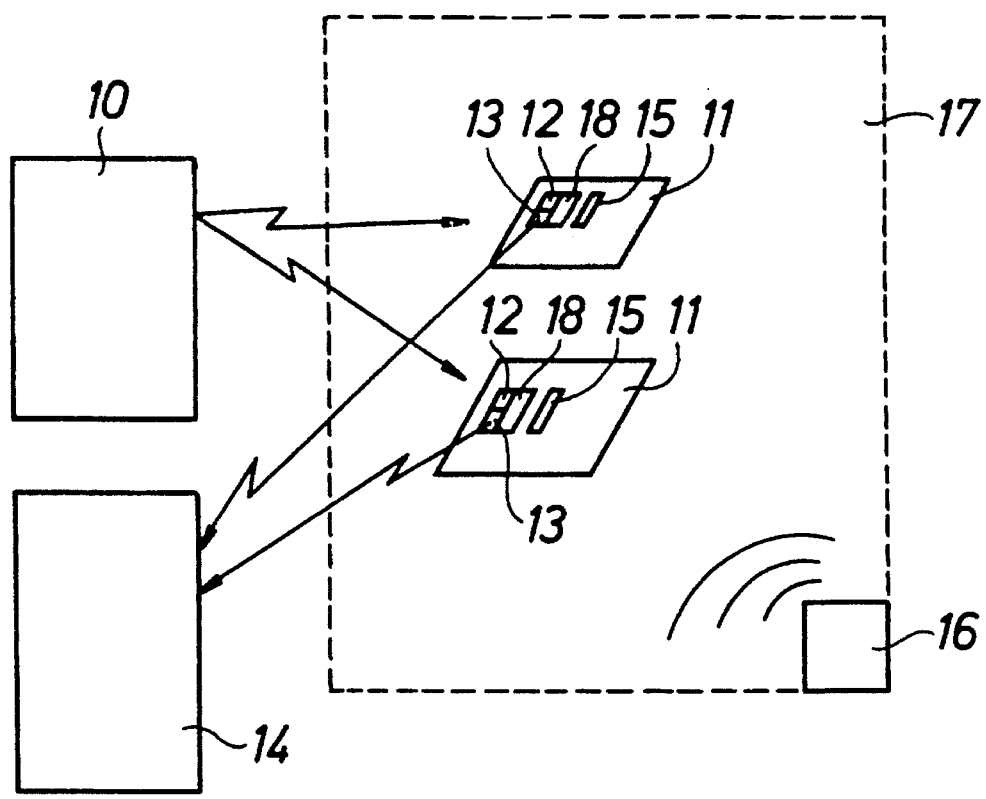
FIG. 1 shows schematically a device according to the invention having two transponders in an interrogation zone.

FIG. 1 shows basically how a device according to the invention can be formed. A means 10 is provided for generating and transmitting an electromagnetic field to a detection or interrogation zone 17. Preferrably said means is formed as a radio transmitter and transmits signals within the radio frequency interval. Two transponders or transponder units 11 are according to FIG. 1 disposed in said interrogation zone 17. As will be clear from the description below the number of transponder units in the interrogation zone is more or less unlimited. Each transponder unit 11 is provided with a storing means 12 normally in form of an electronic memory. In said storing means 12 identification data of each of the transponder units is stored. Said transponder units comprise also transmitter means 13 for transmitting a signal including said identification data. According to the normal function of the transponder a signal is transmitted when said transmitter has put out a signal intended for said transponder unit 11. The device according to the invention includes also a receiver means 14 for receiving a signal put out from said transmitter means 13. Preferably said receiver means 14 includes a radio receiver. Said receiver means 14 is provided also with means for decoding identification data that has been transmitted from the transmitter means 13 of said transponder unit. In most applications the transponder units 11 are arranged on different types of objects, carried by persons, or attached to animals. In at least the first mentioned application certain problems arise if a plurality of identical objects simultaneously are located in said interrogation zone. If the total number of objects is very limited such problems can be avoided by giving to each transponder unit a unique identification code so that said identification will distinguish also identical objects. However, in some applications it is desirable that identical objects emit identical identification codes, and in such cases the embodiment described above is less appropriate. There will also arise problems if the total number of objects is very large making it very difficult to provide all objects, that is also identical objects, with unique identification codes.

Therefore, according to the invention, an element 15 is arranged on the transponder unit 11. Said element is made of a material, the magnetic properties thereof being affected by an external magnetic field. At the interrogation zone 17 there is provided a means 16 for generating a magnetic field, the extension thereof covering the complete interrogation zone 17 and any elements 15 located therein. Preferably said means 16 for generating a magnetic field is formed as a coil or a set of coils but also different types of permanent magnets can be used. When said element 15 is exposed to the magnetic field from said means 16 the magnetic properties thereof are changed. Also the mechanical properties of said element 15 can be changed which is obvious from the description below with reference to FIG. 3 and FIG. 4. In said transponder unit 11 there is provided a processing means 18 sensing any changes of the magnetic properties of said element 15, and modifying the signal normally transmitted from said transmitter means 13. The modification is made in a way that depends on the magnetic field actually affecting said element 15. Preferably said element 15 is formed as a tape, a wire or a strip of amorphous material which has the desired magnetic and mechanical properties. Said processing means 18 can be more or less complex and include for instance a microprocessor or another corresponding control unit.

Figure 2:
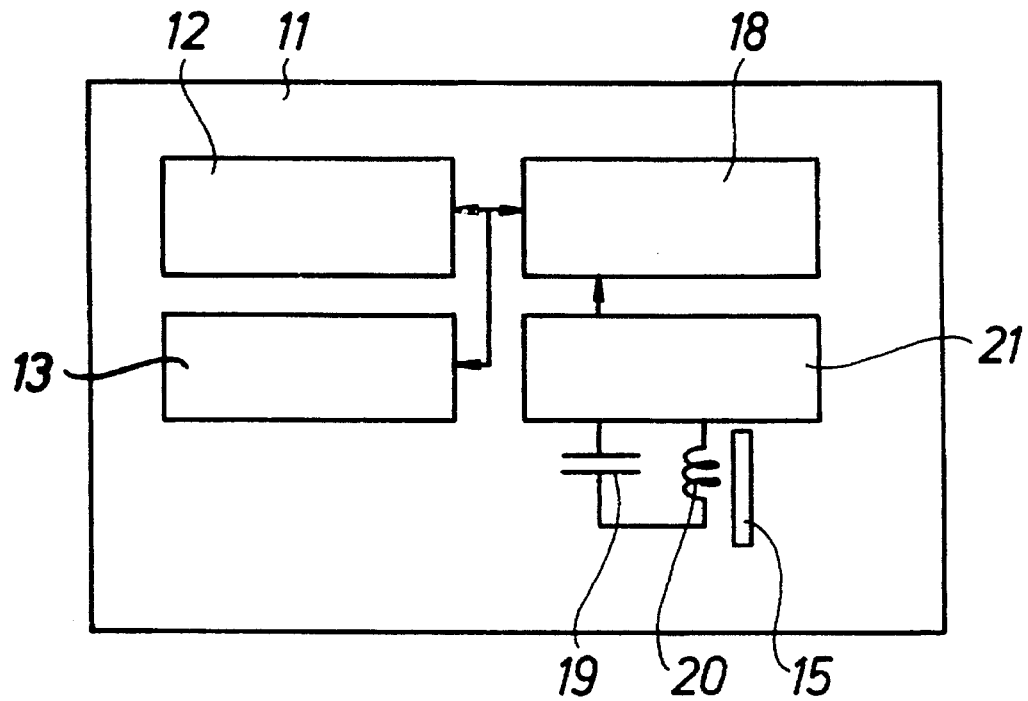
FIG. 2 is a block diagram showing a transponder unit.

FIG. 2 shows a preferred embodiment of said transponder unit 11. According to the shown embodiment said transponder unit 11 is provided with an electric oscillator circuit having a capacitive element 19 and an inductive element 20. Said inductive element 20 is magnetically coupled to a tape 15 made of amorphous material. Said transponder unit 11 comprises also means 21 for detecting the resonant frequency of said electric oscillator circuit. Preferably said means 21 includes a frequency counter and an interface for transferring a detected frequency value to said processing means 18, which is formed to add to its reply signal information about the frequency value. The frequency value detected by said means 21 depends through the magnetic properties of said tape 15 on the magnetic field existing in the interrogation zone. The frequency value can be added to said reply signal also by modulating the reply signal. By generating the magnetic field in said interrogation zone in a desired way it will then be possible to identify individually a plurality of transponders having an identical identification code and being located in said interrogation zone. If said means 16 for generating a magnetic field is activated to transmit a magnetic field having a gradient throughout the interrogation zone different transponders or rather the tapes 15 of different transponders, will be exposed to magnetic fields of different strength and/or different direction. Then the magnetic properties of said tape 15 will be changed differently resulting directly in different resonant frequences of the oscillator circuits. The reply signals of said transponders having identical identification code will then be different.

Figure 3:
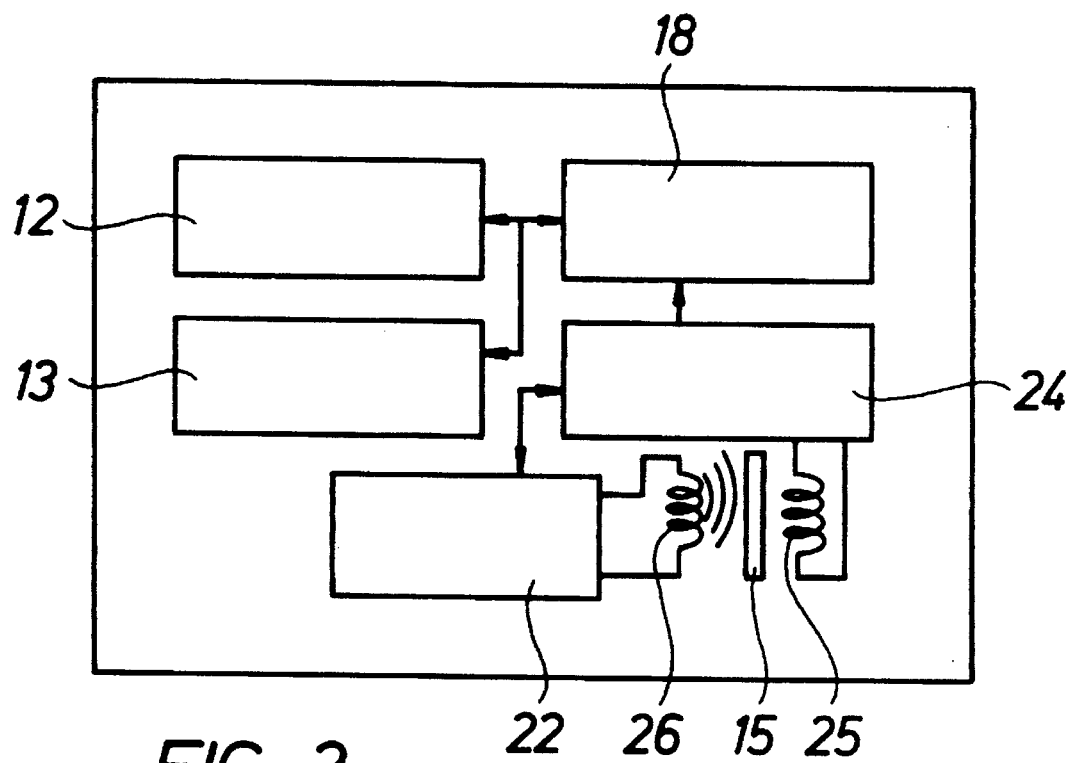
FIG. 3 is a block diagram showing an alternative embodiment of a transponder unit.
Figure 4:
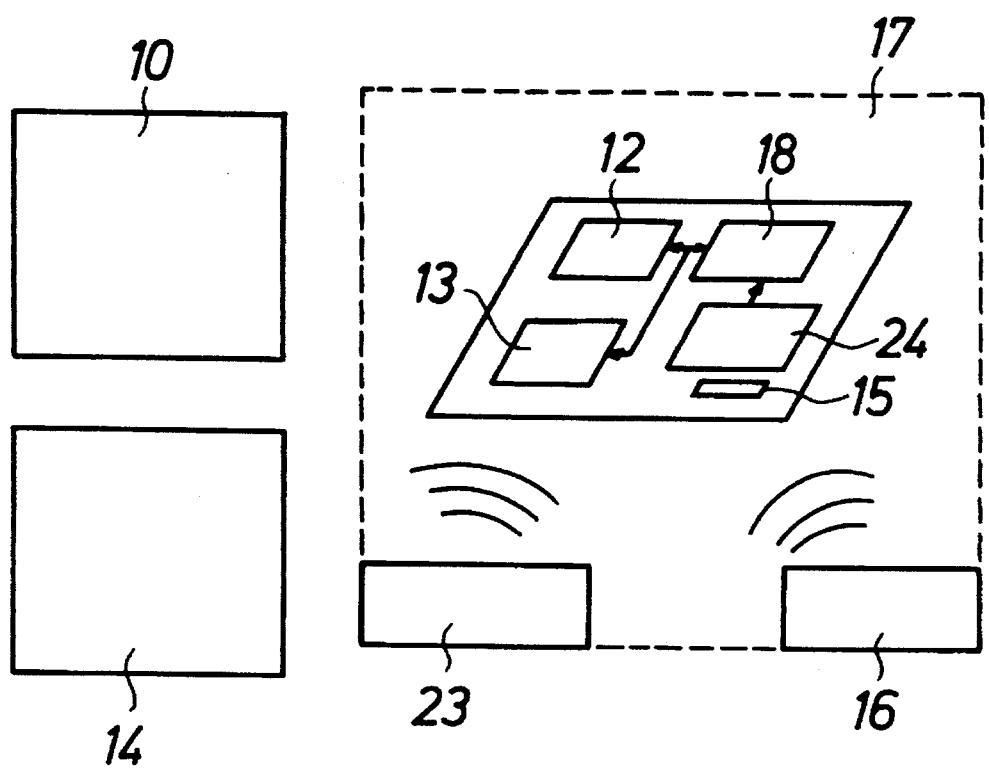
FIG. 4 is a block diagram showing a further alternative embodiment of a transponder unit according to the invention.

FIG. 3 and FIG. 4 show an embodiment that basically differs from the embodiment of FIG. 2. In the embodiment according to FIG. 2 said tape 15 is arranged so that it may really have a mechanical oscillator transition, that is the tape is not mechanically fixedly attached. To excite said tape to mechanical oscillation some kind of impulse is required. According to the invention preferably an impulse in form of a magnetic signal, having a specific frequency content, is used. For instance the frequency corresponding to the resonant frequency of the tape has to be included in the magnetic signal. According to a preferred embodiment the signal is varied or scanned over a frequency interval in which the resonant frequency is included.

In the embodiment according to FIG. 3 an excitation means 22 is provided in the transponder. Said excitation means 22 is provided to generate a signal varying in an appropriate way, and includes a coil 26. Said excitation means 22 is operatively connected to a gauge means 24 comprising a detecting coil 25 and being arranged to detect the resonant frequency of said element 15. Said gauge means 24 is arranged also to transmit a detected resonant frequency value to said processing means 18. Thus, each transponder is provided in this embodiment with a separate excitation means 22 which is locally arranged on said transponder.

The embodiment according to FIG. 4 includes instead of separate excitation means a common excitation means 23 at the border of said interrogation zone 17. Thus, said common excitation means 23 excites all tapes 15 within said interrogation zone 17, and no specific excitation means is provided on each transponder.

Figure 5:
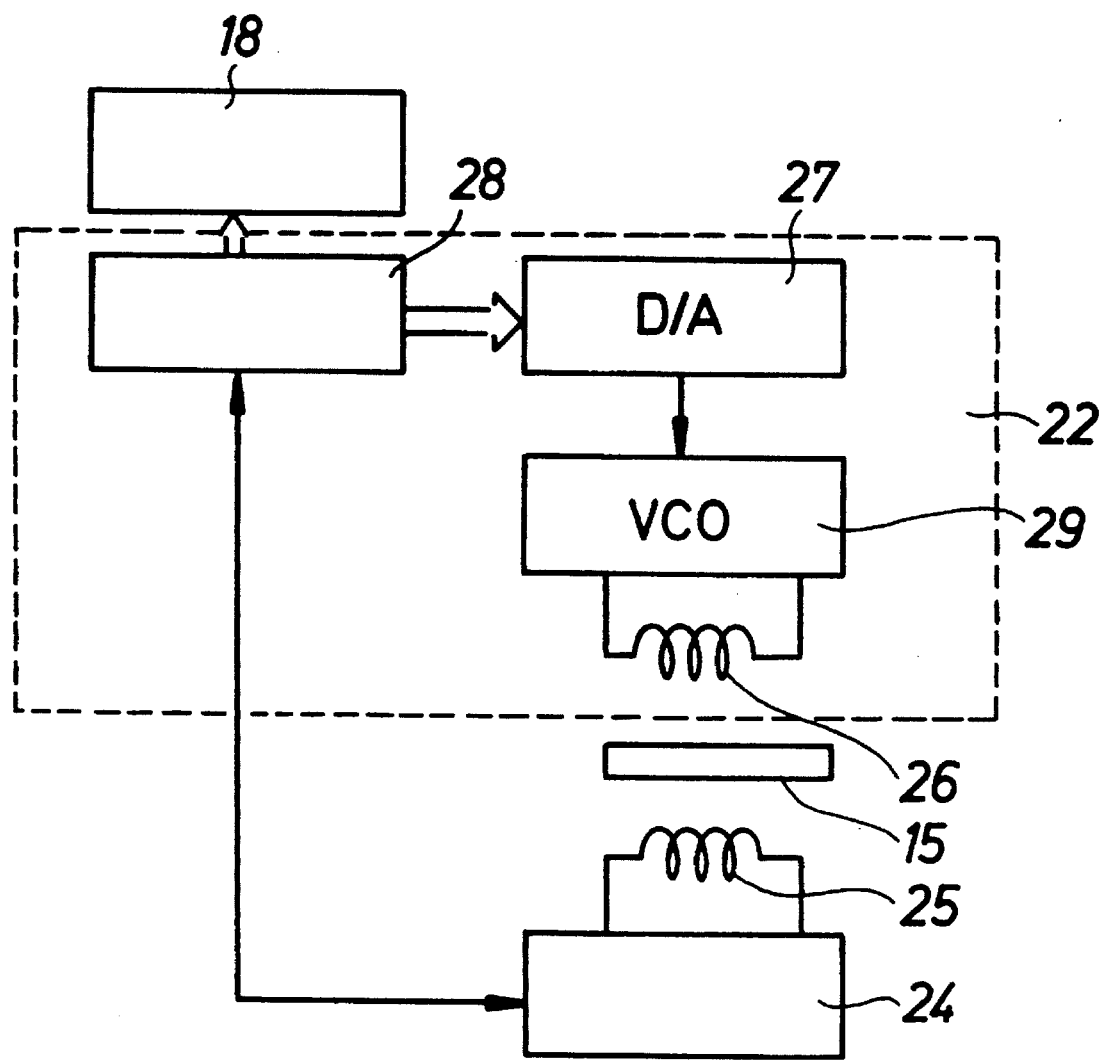
FIG. 5 is a block diagram of an excitation means included in the invention.

FIG. 5 shows a basic embodiment of said excitation means 22 and the connection thereto to cooperating means. Said excitation means 22 comprises a controlled unit 28 preferably including a counting means. Said control unit 28 outputs a digital signal to a digital-to-analog convertor 27, the output thereof in a preferred embodiment being a ramp signal. Then the output signal is fed to a voltage control oscillator 29 driving said coil 26. Thus, said coil 26 will transmit a magnetic field having a varying frequency. Said magnetic field will excite at a certain frequency said element 15 to oscillation, the signal detected by said detecting coil 25 then dramatically changing with regard to for instance the phase point thereof. The changed signal is detected in said gauge means 24, which then transmits a signal to said control unit 28 in said excitation means 22. The value existing at this stage in said control unit 28 is thus related to the resonant frequency of said element 15 and also to the magnetic field in the point where the element 15 is located.

The invention described above can be used also in other more specific applications. An example could be measuring processes according to which a plurality of transponders are arranged spread out in a volume or in an area to measure any parameter therein. In such an embodiment said transponders also have to be provided with some kind of gauge, for instance temperature or pressure gauges. Said gauge will add further information to the reply signal in form of the detected measuring value. It will then be possible also to obtain information about the position or the orientation of all transponders or the element 15 of said transponders in said interrogation zone.

The external magnetic field biasing or influencing said element 15 in a way distinguishing said element 15 can be constituted by the terrestrial magnetic field, possibly deflected by some type of magnetic field deflecting means.

In other application said external magnetic field is completely homogenous with parallel lines of force. It is then not possible to add to the reply signal position dependent information but instead orientation dependent information because the change of magnetical properties of said element will depend on the orientation of the element in the magnetic field.

To increase the security of detecting the external field of power affecting or loading the element in the transponder it is in certain applications appropriate to perform a plurality of measuring processes in sequence. Between such measuring processes the conditions of the field of power is then changed so that the element can be distinguished from each other irrespective of the location or orientation of the element.

The embodiments described above are just examples of embodiments, and the invention can be varied to a large extent by a man skilled in the art within the scope defined the accompanying claims. It is for instance possible to provide instead of a magnetic bias field an electromagnetic field from a radio antenna. In the vicinity of the radio antenna the electromagnetic field will correspond to a heterogenous magnetic field, and by measuring the field strength by gauges of the transponder a signal is obtained corresponding to the signal from an element of amorphous material as described above.

We claim:

1. An electronic identification device, comprising:
   means for generating and transmitting an electromagnetic field;
   a plurality of transponder units, each of which including storing means for storing identification data, and transmitter means for transmitting a signal comprising said identification data when each of said transponder units has been exposed to said electromagnetic field;
   receiver means for receiving said signal and for decoding said identification data;
   at least one element made of a material, having at least one of a magnetic property and electric property being affected by an external magnetic field, being arranged within said transponder unit;
   means for generating said magnetic field being provided at an interrogation zone to affect elements located in said interrogation zone; and
   processing means being provided in said transponder unit for modifying said signal in dependence of the magnetic field affecting said at least one element.

2. Device according to claim 1, wherein said element is made from at least one of a tape, a wire, and a strip of amorphous material.

3. Device according to claim 1, wherein said means for generating the magnetic field is arranged to generate a magnetic field that is heterogenous within said interrogation zone.

4. Device according to claim 3, wherein said transponder unit is provided with at least one electric oscillator circuit having a capacitive element and an inductive element, said element is located so as to be magnetically coupled to said inductive element, and said transponder unit is provided with means for detecting a resonant frequency of said electric oscillator circuit and for outputting a detected frequency value to said processing means.

5. Device according to claim 3, further comprising excitation means for generating a magnetic field signal exciting said element to a mechanical oscillation, wherein said transponder unit is provided with means for detecting the resonant frequency of said element and for outputting a resonant frequency value detected to said processing means.

6. Device according to claim 5, wherein said excitation means is provided on said transponder unit.

7. Device according to claim 5, wherein said excitation means is provided at a border of said interrogation zone.

8. Method of electronically identifying objects according to which an electromagnetic field is generated be transmitted into an interrogation zone, comprising the steps of:

initiating transmission of a reply signal associated to each of said objects to be transmitted;

transmitting the reply signal as an electromagnetic signal from said one object;

receiving and decoding said reply signal, each of said objects storing by electronic means identification data;

providing an element, having magnetic properties being changed by an external magnetic field; and exposing the element to a magnetic field in said interrogation zone; and affecting the reply signal, by a change of magnetic properties of said element, in a characteristic manner of the magnetic field of the interrogation zone in which said element is located.

* * * * *